United States Patent Office 3,060,194
Patented Oct. 23, 1962

---

3,060,194
4-CYANO-3-OXO-PYRROLIDINE CARBOXYLATES
John Song, Bridgewater Township, Somerset County, and Francis X. Markley, Piscataway Township, Middlesex County, N.J., assignors to American Cyanamid Company, New York, N.Y., a corporation of Maine
No Drawing. Filed Mar. 29, 1960, Ser. No. 18,250
2 Claims. (Cl. 260—326.3)

This invention relates to new organic compounds. More particularly, it relates to 3-carboxamide- or 3-cyano-4-oxo-1-pyrrolidinecarboxylic esters and N-carbalkoxy-N-(2-cyanoethyl)glycine esters.

In the past, pyrrolidone or 4-oxopyrrolidine derivatives, such as the 3-cyano derivative, have been described. (Coker et al., J. Chem. Soc., 1952, 1182.) These pyrrolidones however are not useful for the same purpose as those of the present invention.

We have found that 1-substituted-4-cyano- or carboxamide-3-pyrrolidones (or the corresponding enol form) having the general formula:

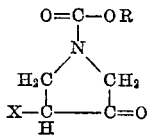

in which R is lower alkyl or aryl radical and X is a —CN or —CONH$_2$ group and are partcularly useful compounds. The present compounds are useful as intermediates in the preparation of the compounds of copending application Serial No. 18,249, filed March 29, 1960, now Patent Number 3,024,243 which in turn have anticonvulsant activity. They also have antibacterial activity, particularly 1-carbethoxy-4-cyano-3-pyrrolidone, against *Sarcina lueta, Bacillus subtilis, Streptococcus faecalis* and *Proteus vulgaris* when tested by the procedure which was essentially that of Waksman et al., Ind. Eng. Chem. Anal. Ed., 17 556 (1945).

The compounds of the present invention are, in general, solids. They are soluble in alcohol and relatively insoluble in ether.

The glycine ester intermediates for the compounds of the present invention are prepared by the reaction of a lower alkyl or aryl chloroformate with a lower alkyl ester of N-(2-cyanoethyl)glycine. The reaction with chloroformate, may be carried out by treatment with the lower alkyl N-(2-cyanoethyl)glycinate in aqueous bicarbonate at temperatures of from about 0° C. to about room temperature. Usually it is not necessary to supply heat to this reaction in order to obtain the desired products. The ester of N-(2-cyanoethyl)glycine may be obtained by reaction of a glycine ester with acrylonitrile in an aqueous alkaline medium.

The pyrrolidine derivatives of the invention are conveniently prepared from the N-carbalkoxy-N-(2-cyanoethyl)glycine esters by ring closure to the 1-carbalkoxy-4-cyano-3-pyrrolidone in the presence of sodium or sodium alkoxide. This ring closure is ordinarily carried out in the presence of an inert solvent such as, for example, benzene, toluene or xylene. Toluene or xylene are preferred as the solvents since the high boiling points of such solvents allow reaction at temperatures above 100° C. (without pressure) which temperatures are usually desirable to effect a complete reaction within a reasonable time. The sodium alkoxide used as a condensing agent may be advantageously prepared by the addition of sodium and an aliphatic alcohol (such as ethanol) to the reaction mixture.

The derivatives as obtained in the ring closure reaction are usually in the form of the sodio derivatives. However, the products may be converted to the metal-free form by addition of strong acid to an aqueous solution of the sodio derivative.

The amides corresponding to the cyano derivatives of the invention can be obtained by conversion of the cyano compounds in concentrated sulfuric acid.

The following examples illustrate the preparation of the compounds of the present invention in greater detail. All parts are by weight unless otherwise indicated.

EXAMPLE I

*Preparation of Ethyl N-(2-Cyanoethyl)-N-Carbethoxyglycinate*

Thirty-nine parts of ethyl N-(2-cyanoethyl)glycinate is reacted with 38 parts of ethyl chloroformate at 0–7° C. in the presence of ten parts of sodium bicarbonate and 25 parts of water. The mixture is stirred for 1 hour at 0° C. and then allowed to warm to room temperature until the evolution of gas ceases (about 30 minutes). The oily organic layer is taken up in ether, the ether solution is washed with water, dried over sodium sulfate and evaporated. The residue is distilled at 0.25 mm. That portion boiling at 125–129° C. is collected and amounts to 42 parts.

EXAMPLE II

*Preparation of 1-Carbethoxy-4-Cyano-3-Pyrrolidone*

Twenty-three parts of ethyl N-(2-cyanoethyl)-N-carbethoxyglycinate, 2.3 parts of sodium metal and 250 parts of toluene are heated to the reflux temperature until all of the sodium disappears. The mixture is then cooled and the sodium salt of 1-carbethoxy-4-cyano-3-pyrrolidone collected on a filter. The material is substantially pure and can be used as the sodium salt for condensations with ketones in polyphosphoric acid.

The 1-carbethoxy-4-cyano-3-pyrrolidone may be obtained from its sodium salt by the following procedure. A solution of 50 parts of the sodium salt of 1-carbethoxy-4-cyano-3-pyrrolidone in 125 parts of water is prepared and clarified. Six normal hydrochloric acid is added until the pH reaches 3–3.5. The precipitate which forms is filtered, washed with water and dried.

EXAMPLE III

*Preparation of 1-Carbethoxy-3-Oxo-4-Pyrrolidinecarboxamide*

Five parts of 1-carbethoxy-4-cyano-3-pyrrolidone is heated in 50 parts of concentrated sulfuric acid at 55–60° C. for 2 hours. The reaction mixture is drowned in 200 parts of ice water. The amide is isolated by chloroform extraction and may be purified by recrystallization from alcohol.

EXAMPLE IV

*Preparation of Ethyl N-Carbomethoxy-N-(2-Cyanoethyl)Glycinate*

Thirty-nine parts of ethyl N-(2-cyanoethyl)glycinate is added to a solution of 10 parts of sodium bicarbonate in 25 parts of water and the solution cooled to 0° C. Thirty-three parts of methyl chloroformate is then added in about 15 minutes while the reaction temperature is kept between 0° and 10° C. The solution is stirred and allowed to warm to room temperature. The product is extracted with two 130 part portions of benzene or ether and the extracts combined, dried over sodium sulfate and the solvent evaporated. The residue is distilled at 0.25 mm. and that portion boiling between 120°–123° C. is taken as pure ethyl N-carbomethoxy-N-(2-cyanoethyl)glycinate.

EXAMPLE V

*Preparation of 1-Carbomethoxy-4-Cyano-3-Pyrrolidone*

Twenty-one parts of ethyl N-carbomethoxy-N-(2-cyanoethyl)glycinate and 2.3 parts of metallic sodium in the form of chunks or ribbon are put into 85 parts of dry toluene. The mixture is heated and stirred at reflux until all of the sodium disappears. The solution is cooled and the sodium salt of 1-carbomethoxy-4-cyano-3-pyrrolidone is isolated by filtration. The free 1-carbomethoxy-4-cyano-3-pyrrolidone is obtained by dissolving the sodium salt in water and adding dilute sulfuric acid until precipitation is complete.

EXAMPLE VI

*Preparation of Ethyl N-Carbophenoxy-N-(2-Cyanoethyl)Glycinate*

Thirty-nine parts of ethyl N-(2-cyanoethyl)glycinate is added to a solution of 10 parts of sodium bicarbonate in 25 parts of water and the solution is cooled to 0° C. Fifty parts of phenyl chloroformate is added in 15 minutes while the reaction temperature is kept between 0° and 10° C. The solution is stirred and allowed to warm to room temperature. The product is extracted with two 105 part portions of ether and the extracts combined, dried over sodium sulfate and the solvent evaporated. The residue is distilled at 0.25 mm. The fraction boiling at 150–153° C. is taken as pure ethyl N-carbophenoxy-N-(2-cyanoethyl)glycinate.

EXAMPLE VII

*Preparation of 1-Carbophenoxy-4-Cyano-3-Pyrrolidone*

Twenty-six parts of ethyl N-carbophenoxy-N-(2-cyanoethyl)glycinate and 2.3 parts of metallic sodium are mixed with 100 parts of dry toluene and brought to reflux. The mixture is heated at refluxing temperature with stirring until all of the sodium disappears and then cooled. The sodium salt of 1-carbophenoxy-4-cyano-3-pyrrolidone is isolated by filtration. The 1-carbophenoxy-4-cyano-3-pyrrolidone is obtained by dissolving the sodium salt and adding dilute hydrochloric acid until precipitation is complete.

We claim:
1. The compound 1-carbophenoxy-4-cyano-3-pyrrolidone.
2. The compound 1-carbethoxy-4-carboxamido-3-pyrrolidone.

References Cited in the file of this patent

Uchibayashi: "Chemical Abstracts," vol. 53, page 331 (1959).